No. 669,046. Patented Feb. 26, 1901.
D. D. MILES.
COTTON HARVESTER.
(Application filed Sept. 4, 1900.)
(No Model.) 5 Sheets—Sheet 1.

Fig. 1.

Witnesses,
Edward C. Brunck
Louis Evans

Inventor,
Don D. Miles

No. 669,046. Patented Feb. 26, 1901.
D. D. MILES.
COTTON HARVESTER.
(Application filed Sept. 4, 1900.)
(No Model.) 5 Sheets—Sheet 3.

Fig. 3.

Witnesses
Edward C. Bunck
Louis Fraus

Inventor.
Don D. Miles

No. 669,046. Patented Feb. 26, 1901.
D. D. MILES.
COTTON HARVESTER.
(Application filed Sept. 4, 1900.)

(No Model.) 5 Sheets—Sheet 4.

Witnesses.
Edward E. Brinck
Louis Frans

Inventor.
Don D. Miles

No. 669,046. Patented Feb. 26, 1901.
D. D. MILES.
COTTON HARVESTER.
(Application filed Sept. 4, 1900.)
(No Model.) 5 Sheets—Sheet 5.

UNITED STATES PATENT OFFICE.

DON D. MILES, OF AURORA, ILLINOIS, ASSIGNOR, BY MESNE ASSIGNMENTS, TO THE COLUMBIAN COTTON HARVESTER COMPANY, OF CHICAGO, ILLINOIS.

COTTON-HARVESTER.

SPECIFICATION forming part of Letters Patent No. 669,046, dated February 26, 1901.

Application filed September 4, 1900. Serial No. 28,910. (No model.)

*To all whom it may concern:*

Be it known that I, DON D. MILES, a citizen of the United States, residing at Aurora, in the county of Kane and State of Illinois, have invented a certain new and useful Improvement in Cotton-Harvesters, of which the following is a specification.

My invention relates to cotton-harvesters, and has for its object to provide a new and improved harvester of this description.

My invention is illustrated in the accompanying drawings, wherein—

The same letters of reference apply to the same parts in the different figures.

One of the objects of my invention is to provide a cotton-harvester which is provided with a series of pickers to engage the cotton-plant, the pickers being arranged so as to reduce to a minimum the injury to the plant.

In carrying out my invention I provide two supporting-wheels A, each carrying a series of pickers B, adapted to be projected toward the cotton-plant so as to engage it. These pickers may be of any desired construction, and as herein shown they are made by taking two flat pieces of metal and placing between them a piece of haircloth, the pieces being twisted into a spiral form, so that the edges of the haircloth project, forming engaging devices B'. These pickers work in suitable guides C, connected with the web of the wheel, and may be attached in position in any desired manner. As herein shown, the web of the wheel is provided with screw-threaded openings into which the guides are screwed, each guide being provided with a locking-nut, which insures its being held in position. The pickers are rotatably connected to the movable bars D D⁹, which are mounted between the hub and rim of the wheel. These bars may be of any desired length, depending, of course, upon the size of the wheel, and any desired number of pickers may be connected to each bar. This arrangement will depend upon the conditions to be met. Some suitable means is provided for moving the bars D D⁹ in a direction substantially parallel to the axle of the wheel. The guides C are so constructed as to produce a rotation of the pickers when the pickers are reciprocated by the movement of the bars D D⁹. Any suitable construction for this purpose may be used.

Figure 5:
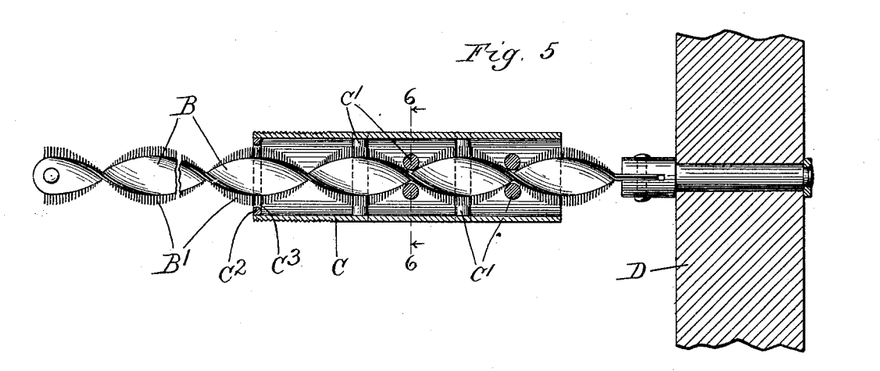
Fig. 5 is a section through one of the guides, showing the picker in position.
Figure 6:
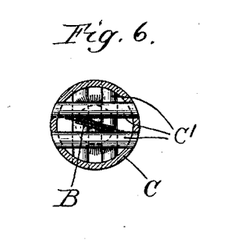
Fig. 6 is a section on line 6 6, Fig. 5.
Figure 7:
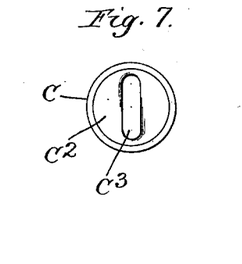
Fig. 7 is an end view of one of the guides.
Figure 8:
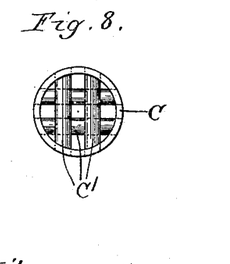
Fig. 8 is an end view of one of the guides, showing a modified construction.

As shown in Figs. 5 and 6, the guides C consist of a suitable holding-piece, which, as illustrated in the drawings, consists of a holding-piece carrying a series of pins or engaging pieces C', connected therewith in pairs, the opposed pins being separated by a space through which the picker passes. These engaging pieces or pins are the things which engage the spiral part of the pickers and cause the rotation; but it is necessary or at least desirable to have them connected together at both ends by some suitable means. In the drawings this means is the holding piece or tube C. It is desirable to have at least two pairs of these pins, the pairs being at an angle to each other. The engagement of the spiral of the picker with these pins as it passes through the space between them produces a rotation of the spiral when the picker is reciprocated. The distance apart of these sets of pins and the angle between the different sets depends, of course, upon their position and the pitch of the spiral of the picker. If, for example, it is desired to have the sets of pins at right angles to each other, as shown in the drawings, the sets must be separated by a distance equal to one-fourth the pitch of the spiral or some multiple thereof. If they are separated in any other ratio, the angle between the sets will be something other than a right angle. It is of course evident that other devices than pins could be used; but I find that the round faces of the pins prevent injury and displacement to the engaging devices B' on the pickers. At the inner end of the tube—that is, the end nearest the cotton-plant—I may provide a plate C², provided with an elongated opening C³, through which the picker projects. This plate engages the cotton when the picker is retracted and removes it from the picker. This plate of course is not necessary, and a pair of pins may be placed at the end in lieu of the plate, as shown in Fig. 8, the space between the pins forming the opening through which the picker passes in its movement back and forth through the guide.

Figure 1:
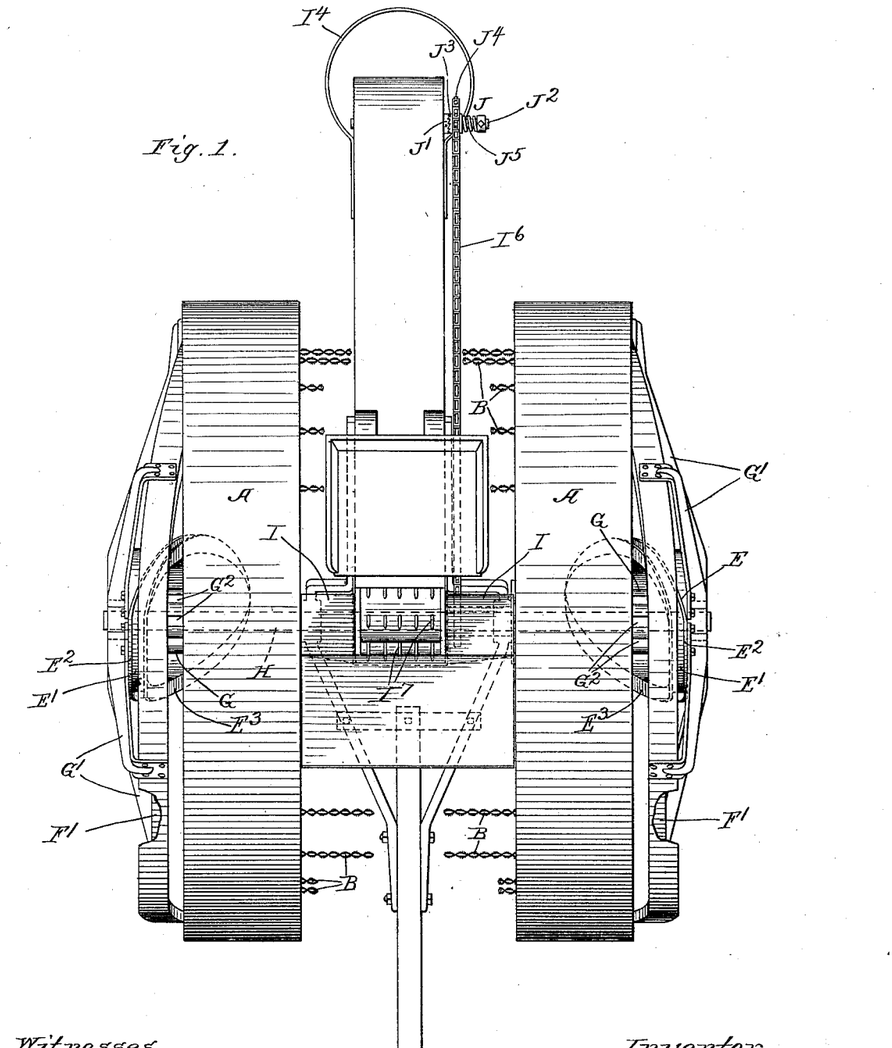
Figure 1 is a plan view, with parts omitted, of a harvester embodying my invention.
Figure 2:
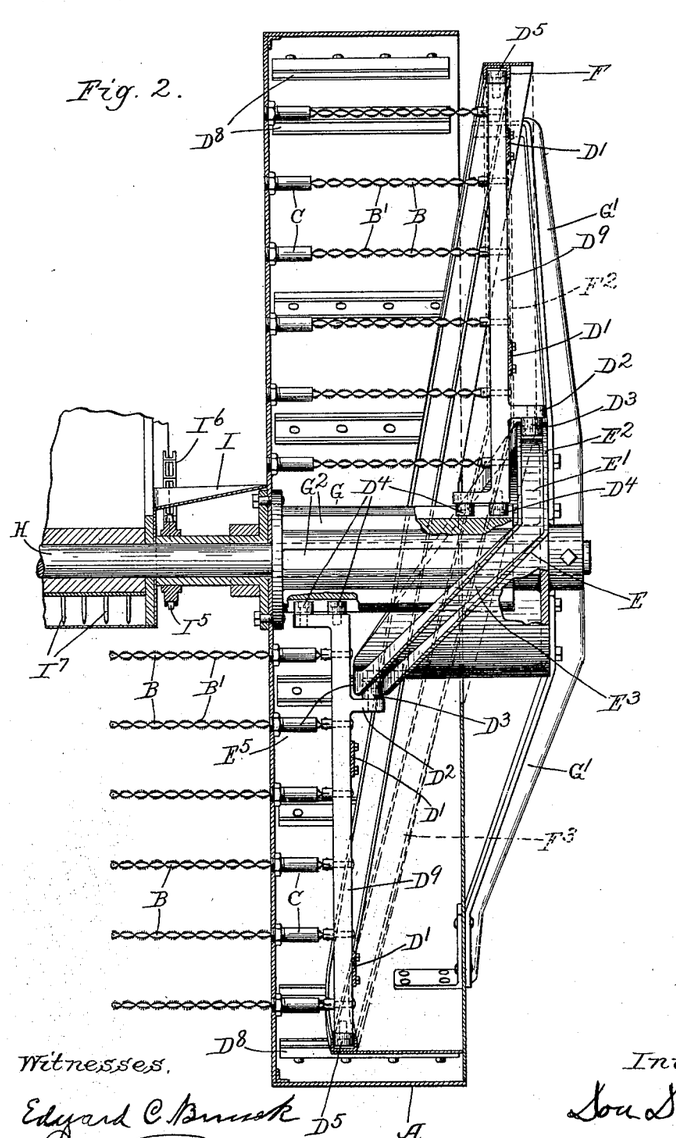
Fig. 2 is a view in part section of one of the supporting-wheels, showing the operating mechanism.

As the cotton-plant to be acted upon is located between the wheels A and is below the axle thereof, it is exceedingly desirable to have the mechanism for moving the bars D D⁹ and projecting the pickers B so arranged that the pickers will not be projected until they approach or come opposite the cotton-plant. It is then desirable to have the pickers project quickly into the cotton-plant, so as to engage the cotton and cause it to be wrapped about them. I have illustrated in the drawings one form of device for this purpose, which, as it were, accelerates the speed of the bars and the pickers as the pickers are being projected into the cotton-plant, thus accelerating the speed of rotation of the pickers, this being the result desired. The movement of the bars and pickers toward the cotton-plant is retarded or postponed, as it were, during a part of their downward travel; but during a portion at least of the latter part of this downward travel and while the pickers are being projected into the cotton-plant this movement and the speed of the parts is accelerated. I provide each wheel with two cams E and F, which engage suitable engaging devices on some or all of said bars. This cam E is formed hollow, as shown in Fig. 2, and surrounds the hub G of the wheel. The cam is stationary and is supported upon the axle H, which projects beyond the hub G. The cam F is supported in a fixed position by means of the supports G'. The cam E is provided with a suitable guideway E', which is engaged by an engaging device on the bars. This guideway may be divided into two parts—the part which moves the bars and pickers forward and the part which retracts them or moves them backward. The guideway E' of the cam is substantially straight for a portion of its length, as shown at E², and may be in a plane perpendicular to the axle. Another portion E³ of this guideway is inclined, as shown. This is the active part of the guideway in projecting or moving the pickers forward toward the cotton-plant. The remaining portion of the guideway is a general incline to the end of the part E². The pickers are retracted when this part of the guideway is engaged. The cam F is provided with the parts F² and F³, which correspond with the parts E² and E³ of the cam E.

Figure 3:
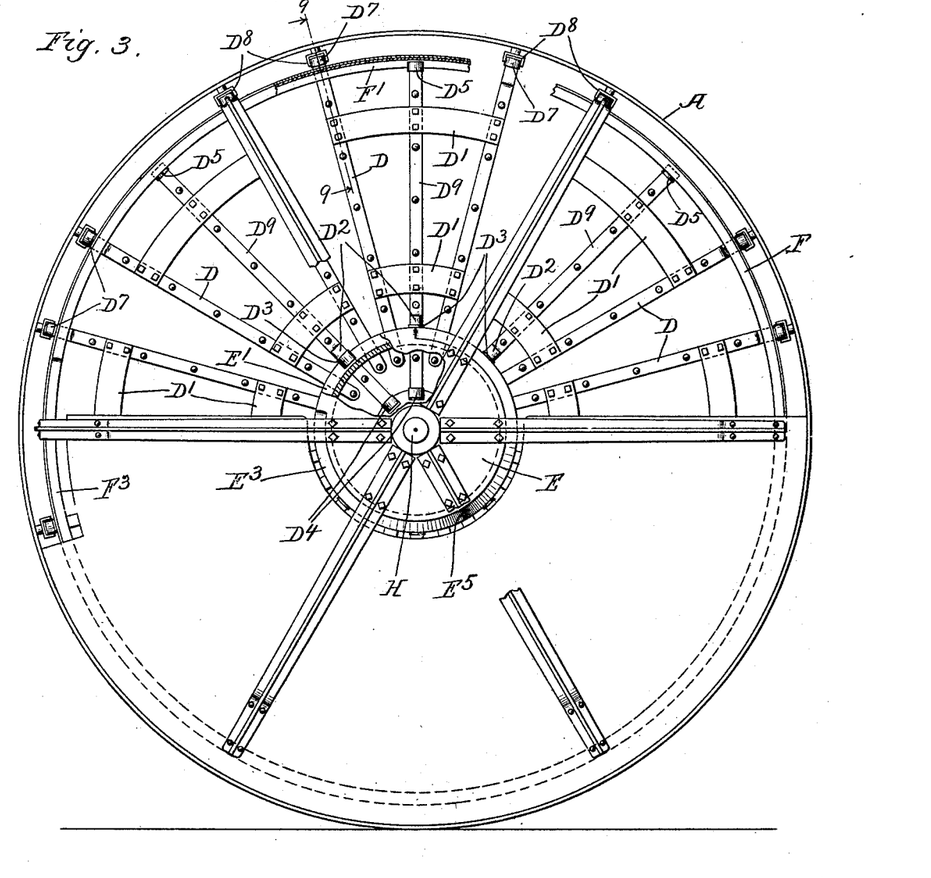
Fig. 3 is a view with parts broken away, showing the outside face of one of the wheels.
Figure 4:
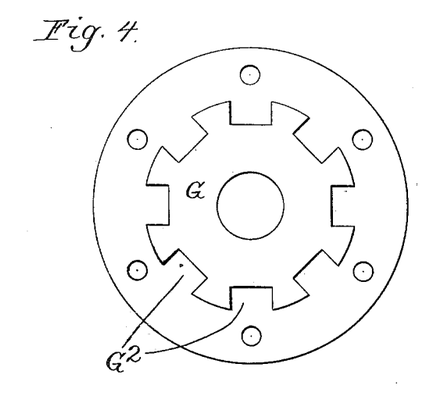
Fig. 4 is an end view of the hub of one of the wheels.
Figure 9:
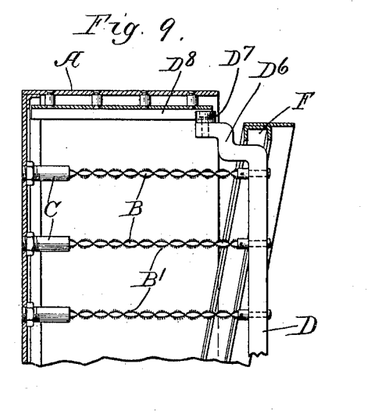
Fig. 9 is a section on line 9 9, Fig. 3.

If the bars which carry the pickers are disconnected and independent, it will of course be necessary to provide each bar with an engaging device or some proper means of connecting it with the guideway in the cam E, so that each independent bar will be given the proper movement. In this event, of course, each bar and the pickers associated therewith will be held back, as it were, during a portion of their downward movement, and they will then be moved rapidly toward the cotton-plant and their speed accelerated during the latter part of their downward movement. I may, however, connect a series of the bars together to form a single unit. In this event it is only necessary to have one of the bars of each series engage the cams. By connecting the other bars of the series with this one by suitable connecting-pieces D', as shown in Fig. 3, it will be seen that they will all be moved simultaneously. As shown in the drawings, each series of bars consists of three, the center or middle one D⁹ being connected with the cams E and F. One of the bars D⁹ of each series is provided with some suitable connection, which engages the cams E and F and acts as a driving-bar for the others. Any suitable construction for this purpose may be used. As herein shown, the middle bar of the series is provided between its ends with a laterally-projecting arm D², carrying a roller D³, which engages the cam E. The inner end of this bar is provided with one or more engaging devices or rollers D⁴, which engage grooves G² in the hub G. This end of the bar D⁹ projects past the cam E, as shown, and the hub passes through the hollow of the cam. By this construction a series of bars are moved in unison and are substantially in the same plane. This permits a greater number of pickers to be projected or thrust into the cotton-plant at one time than would be the case if the bars were independent and all of them were connected to the cams. This construction also permits the use of a longer bar, and thus permits a greater number of pickers to be connected to each bar. The pickers may thus be placed near to the axle of the harvester, so as to act efficiently upon high cotton-plants. As only one of each series of bars is connected with the hub, there will be plenty of room for this purpose, and the hub may be made small, so as to bring the near pickers very close to the axle, as shown in Fig. 2. It is of course evident that there is a limited space on the hub of the wheel, and hence only a limited number of bars can be made to engage said hub or the cam. This feature limits the number of bars which can be used when they all engage the hub or cam. It will therefore be seen that one of the advantages derived from connecting a series of bars together and having only one of the series connected to the hub or cam is that the capacity of the wheel is increased and a larger number of bars can be spaced about the wheel. The outer end of each driving-bar D⁹ is provided with an engaging device for the cam F, which in this instance consists of a roller $D^5$. The outer ends of the other bars D of each series do not engage the cam F, but are provided with an offset $D^6$, Fig. 9, which has an engaging device or roller $D^7$, adapted to engage grooves or guides $D^8$ on the rim of the wheel. It will thus be seen that the driving-bar $D^9$ engages guides on the hub of the wheel, while the other bars D engage guides on the rim of the wheel. The engagement of these bars with the guides insures the proper position of the bars as they are reciprocated. The pickers should continue to move toward the cotton-plant until they reach the vertical plane passing through the axle. When a series of the bars are connected together and are driven by one bar, the driving mechanism must be so constructed as to bring about this result. As shown in the drawings, this result is obtained by forming or arranging the cams E so that the maximum inward position or point of the groove or guide is behind or at one side of the vertical plane passing through the axle of the wheel, as shown at $E^5$, Fig. 3. In other words, the inward end of the inclined portion $E^3$ of the groove of the cam instead of being in the vertical plane passing through the axle is at one side of said vertical plane—that is, at the point $E^5$. It will thus be seen that by this construction the middle or driving bar of each series is still moving toward the cotton-plant after it has passed the vertical plane through the axle and until it reaches the point $E^5$, and the position of the parts is such that the rear bar of the series will reach this vertical plane while still moving toward the cotton-plant.

As the movement of the bars produces the rotation of the pickers, it will be seen that this construction insures the rotation of the pickers when in engagement with the plant, and thus causes said pickers to remove the cotton from said plant.

I have shown a particular construction embodying an invention in order to make the invention clear and have described this construction very particularly. I wish it to be understood, however, that I do not limit myself to the construction shown, as I may vary many of the parts and omit some of them and use others with parts not herein described. I also wish it to be understood that I do not limit myself to the construction shown in the arrangement and means and uses of the device for accelerating the speed of rotation of the pickers when projected into the cotton-plant. This device is of course as applicable to one bar or to any number of bars or pickers as to the construction shown.

Figures 10, 11:
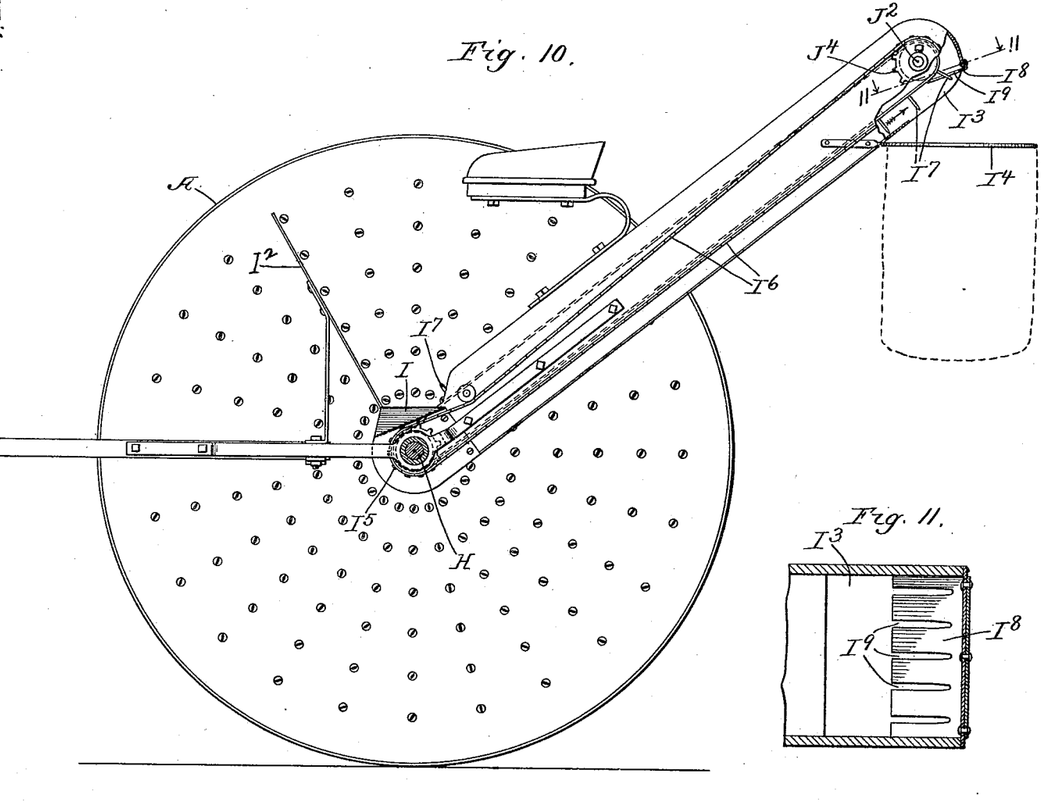
Fig. 10 is a view of the harvester with one wheel removed, showing the elevator.
Fig. 11 is a section on line 11 11, Fig. 10.

After the pickers have engaged the cotton and it has become entangled by the engaging devices the withdrawal of the pickers into the guides removes the cotton therefrom. A suitable receptacle I is located between the wheels and is adapted to receive this cotton. I prefer to elevate the front side of the receptacle, as shown at $I^2$, the construction being such that this front side engages any cotton that may be carried forward by the momentum of the wheel, and thus prevents it from moving past the receptacle. An elevator of any suitable construction is located between the wheels and is connected with the receptacle I, so as to engage the cotton which falls therein and move it up to the discharge end $I^3$. A suitable device—such, for example, as a sack or the like—may be attached to the discharge end, as by fastening it to the holder $I^4$, the cotton being received by the sack. The elevator mechanism is driven from the wheel by the sprocket-wheel $I^5$ and the chain $I^6$. This elevator consists of an endless belt of any suitable description, provided with a series of projections or engaging pins, which carry the cotton to the discharge end. In order to prevent the cotton from being carried past the discharge end, I provide a plate $I^8$, located above the discharge-opening and having slots or openings $I^9$, through which the engaging devices $I^7$ pass. (See Figs. 10 and 11.) It will thus be seen that any cotton that may adhere to these engaging devices is wiped off by the plate $I^8$ and falls through the opening into the sack.

I prefer to provide the driving mechanism of the elevator with a suitable clutch J, so arranged that the elevator will be driven when the device is moving forward, but will remain stationary when the wheel is stationary or is moving backward. This construction facilitates the turning of corners and the handling of the machine. Any of the ordinary clutches for this purpose can be used, and, as herein shown, the clutch consists of two members— a member $J'$, fastened to the shaft $J^2$, and a member $J^3$, connected with the sprocket-wheel $J^4$, mounted on said shaft. The members $J'$ and $J^3$ have engaging beveled teeth, which engage when the sprocket-wheel is running forward. A suitable spring $J^5$ holds the parts in engagement when the sprocket-wheel is moving forward or permits the sprocket-wheel to move outwardly when rotated in the opposite direction.

The use and operation of my invention are as follows:

When it is desired to use the harvester, it is moved along by any desired agency, so that a row of cotton-plants will be between the wheels. When the machine is moving forward, the wheels rotate upon the axle H, carrying the bars and spindles about said axle. As the cams E and F are stationary, it will be seen that these bars and spindles are moved back and forth as the wheel rotates.

If now we examine the series of bars at the top of the wheel, as shown in Fig. 2, the operation will be as follows: As the wheel moves forward the connecting devices on the driving-bar pass along the straight portion $E^2$ of the cam-guide, and hence the bars and pickers will not be moved inwardly. When the connecting devices on the driving-bar reach the beginning of the operating part of the cam-guide—that is, the part E³—the bars and guides will begin to move inwardly toward the cotton-plant and will move very rapidly, much more rapidly than would be the case if the cam had a gradual incline and the part E² were omitted. The length of the part E² will depend, of course, upon the conditions to be met. The result of this construction is that the pickers connected with a series of bars will all be rapidly thrust into the cotton-plant when opposite it. In view of the rapid movement the pickers are also rotated at a higher rate of speed, the engaging devices B' engaging the cotton and wrapping it about the pickers, so that it is removed from the plant, and hence the pickers work much more effectively than would otherwise be the case. By having the end of the operating part of the cam-guide at one side of the vertical plane passing through the axle all of the bars in a given series will reach this vertical plane while they are being moved toward the cotton-plant, for the center driving-bar will be moved past this plane while it is still moving forward and will not cease to move forward until it has reached the point E⁵. This point of course will depend upon the number of bars connected together and will be so positioned that the last bar will reach the vertical plane before it begins to be retracted. When the engaging devices on the bar pass the point E⁵ and reach the remaining portion of the cam-guide, the pickers are gradually retracted from the cotton-plant and drawn within the guide, the cotton which has been entangled with the engaging devices B' being removed by engagement with the end of the guide. This cotton then falls into the receptacle I and is carried by the elevator to the sack or other device into which it is to be received. The remaining portion of the cam-guide is the retracting part and forms a gradual incline, as it is not desirable to retract the pickers rapidly, for the cotton must be removed from them by engagement with the end of the guide. It is also desirable to have the pickers get above the horizontal plane of the axle before the cotton falls from them, so that it can fall into the receptacle, and thus be operated upon by the elevator. It will thus be seen that by this construction the speed of the pickers is varied when they occupy different positions without varying the speed of the wheel and that this speed is increased where it is desirable to increase it and decreased where the speed should properly be lowered. It will further be seen that by connecting a series of bars together, so that they move together, a greater number of pickers can be utilized upon a plant at a given time. This feature is of great value for the reason that the pickers can only act upon a plant during a limited period. By holding the pickers back until they approach the plant and then thrusting them out rapidly the injury to the limbs of the plants by the pickers pressing down upon them is obviated. Another result following from the use of a series of bars connected together is that only one of the bars needs to be connected to the hub. This decreases the cost and permits a small hub to be used, thus allowing the pickers to be located close to the hub and permitting the machine of a given height to successfully act upon higher plants than would otherwise be the case. It is necessary to make the cam hollow in order to prevent it from interfering with the ends of the driving-bars which engage the hub and which must necessarily project past the cam.

I claim—

1. A cotton-harvesting machine, comprising a supporting-wheel, a series of pickers carried thereby, a number of movable parts mounted upon said supporting-wheel and to which said pickers are attached, said parts spaced about the wheel and made up in series consisting of two or more separated adjacent parts connected together so as to be moved in unison, and means for moving each series in a direction substantially parallel to the axis of the wheel, so that the pickers attached to all the parts of a given series are moved simultaneously.

2. A cotton-harvesting machine, comprising a supporting-wheel, a series of separated movable parts spaced about said wheel and carried thereby, said separated movable parts connected together so as to move in unison, a series of pickers connected with each movable part, a cam connected with one of the movable parts so that when the wheel is rotated all of said parts will be moved in a direction substantially parallel to the axis of the wheel, so that the pickers attached to all the parts are moved simultaneously.

3. A wheel for cotton-harvesting machines, comprising a series of separated parts spaced about said wheel and connected so as to move together, and a series of pickers connected with each of said parts, in combination with a cam adapted to engage one of said parts so as to move all of them simultaneously in a direction substantially parallel to the axis of the wheel when the wheel is rotated.

4. A wheel for cotton-harvesters, comprising a series of movable parts connected together, a series of spiral cotton-pickers connected with each of said parts, and a guide in which each picker works, provided with engaging devices which cause the picker to rotate when reciprocated in the guide, in combination with means for moving said movable parts in a direction substantially parallel to the axis of the wheel, comprising a device for retarding the speed of said movable parts in the direction of the cotton-plant during the first part of their downward travel and accelerating said speed during a portion of the latter part of their downward travel.

5. A wheel for cotton-harvesters, comprising a series of parts connected together and movable in a direction substantially parallel to the axis of the wheel, a series of spiral cotton-pickers connected with each of said parts, and a guide for each cotton-picker provided with engaging parts which engage the picker and cause it to rotate when reciprocated in the guide, in combination with a cam connected with one of said movable parts, said cam having the portion of the guide which moves the parts and pickers forward inclined to a greater degree than the part which retracts them, so that their speed in moving forward is greater than when moving backward.

6. A wheel for cotton-harvesters, comprising a series of parts movable in a direction substantially parallel to the axis of the wheel, and a series of pickers connected with each of said parts, in combination with a cam provided with an inclined guide, a connecting part connected with one or more of said movable parts and engaging said guide, the portion of said guide along which the engaging part moves when the pickers are moved toward the cotton-plant being inclined to a greater degree than the remaining portion.

7. A wheel for cotton-harvesters, comprising a series of bars adapted to be moved in a direction substantially parallel to the axis of the wheel and connected together, and a series of pickers connected with each of said bars, in combination with a cam provided with an inclined guide, an engaging device on one of said bars adapted to engage said guide, the point of the guide nearest the web of the wheel being located so as to be at one side of the vertical plane passing through the axis of the wheel.

8. A wheel for cotton-harvesters, comprising several series of bars movable in a direction substantially parallel to the axis of the wheel, and a series of pickers connected with each of said bars, in combination with a hollow inclined cam surrounding the hub of the wheel, but fixed against rotation, said cam provided with a guide, an engaging device on one bar of each series which engages said guide, a series of guideways on the hub of the wheel, one bar of each series provided with a part which projects past the cam and engages a guideway on said hub.

9. A cotton-harvesting machine, comprising a series of movable parts movable in a direction substantially parallel to the axis of the wheel of the harvester, an operating-cam provided with a suitable guideway and fixed against rotation, an engaging device associated with some of said movable parts, said engaging device placed between the ends of the movable parts, so that the device projects past the cam in both directions.

10. A cotton-harvesting machine, comprising a wheel, a series of spiral pickers carried by said wheel, a series of guides connected with the web of the wheel, through which said pickers pass, said guide provided with a series of pins fastened to the guides in sets of two with spaces between them, the different sets of pins being placed at an angle to each other, so that they engage the spiral when the picker is reciprocated and cause said picker to be rotated.

11. A cotton-harvesting machine, comprising a wheel, a series of spiral pickers carried by said wheel, a series of guides connected with the web of the wheel, through which said pickers pass, said guides provided with a series of pins fastened in the guides in sets of two with spaces between them, the different sets of pins being placed at an angle to each other, so that they engage the spiral when the picker is reciprocated and cause said picker to be rotated, one or more bars to which said pickers are connected, and means for moving said bars at a varying speed when in different positions without varying the forward speed of the machine.

12. A cotton-harvesting machine, comprising a wheel, a series of spiral pickers carried by said wheel, a series of guides connected with the web of the wheel, through which said pickers pass, said guides provided with a series of pins fastened in the guides in sets of two with spaces between them, the different sets of pins being placed at an angle to each other, so that they engage the spiral when the picker is reciprocated and cause said picker to be rotated, one or more bars adapted to be moved in a direction substantially parallel to the axis of the wheel of the harvester, each bar having a series of pickers rotatably connected therewith, an inclined cam provided with a guide, an engaging device on one or more of said bars adapted to engage said guide, said guide being inclined in different degrees at different points, so as to vary the speed at which the bars are moved without varying the forward speed of the machine.

13. A cotton-harvesting machine, comprising two wheels rotatably mounted upon a suitable axle, each provided with a series of spiral cotton-pickers, a series of guides carried by the wheel, through which the spiral pickers are projected, said guides provided with a series of pins connected to the guides in sets of two, the pins of each set being separated by a space and the several sets being at an angle to each other, said pins adapted to engage the pickers when they are reciprocated so as to rotate them, and means for moving said pickers forward and backward at varying speeds when the harvester is moved forward at a constant speed.

14. The combination with a spiral cotton-picker of a guide in which the picker is reciprocated, said guide provided with a series of stationary pins fastened within the guide in sets of two, the pins in each set separated by a space, said sets being placed at an angle to each other, substantially as described.

15. A cotton-harvester, comprising a series of rotatable cotton-pickers, means for rotating said cotton-pickers comprising a device for accelerating the speed of rotation of said cotton-pickers during a portion of the latter part of their downward movement when the pickers are being projected into the cotton-plant.

16. A wheel for cotton-harvesters, comprising a series of spiral cotton-pickers mounted thereon, a series of guides through which said pickers pass, the pickers engaging the guides so as to be rotated when reciprocated, means for reciprocating said pickers, comprising a device for accelerating the speed of rotation of said pickers during a portion of the latter part of their downward movement when the pickers are being projected into the cotton-plant.

17. A cotton-harvester, comprising a wheel, one or more movable parts carried by said wheel and movable in a direction substantially parallel to the axis of the wheel, one or more pickers connected with each of said parts, a cam provided with an inclined guide, to which one or more of said movable parts are connected, so as to have their position changed when there is a relative movement between each part and the cam, the portion of said guide along which the movable parts move when the pickers are moved toward the cotton-plant being inclined to a greater degree than the remaining portion.

18. The combination with a spiral cotton-picker of a guide therefor, comprising a holding-piece, a series of engaging pieces fastened to said holding-piece in sets of two with spaces between them, the different sets of engaging pieces being placed at an angle to each other, so that they engage the spiral when the picker is reciprocated and cause said picker to be rotated.

DON D. MILES.

Witnesses:
EDWARD C. BUNCK,
FREDERICK L. RIGGS.